US012552654B2

(12) United States Patent
Zacharia

(10) Patent No.: US 12,552,654 B2
(45) Date of Patent: Feb. 17, 2026

(54) SYSTEM AND METHOD FOR CONTROLLING A MOVEMENT FUNCTION OF A MACHINE

(71) Applicant: Terex South Dakota, Inc., Watertown, SD (US)

(72) Inventor: Preethi Zacharia, Redmond, WA (US)

(73) Assignee: Terex South Dakota, Inc., Watertown, SD (US)

( * ) Notice: Subject to any disclaimer, the term of this patent is extended or adjusted under 35 U.S.C. 154(b) by 1018 days.

(21) Appl. No.: 17/653,683

(22) Filed: Mar. 7, 2022

(65) Prior Publication Data

US 2023/0278844 A1 Sep. 7, 2023

(51) Int. Cl.
  *B66F 11/04* (2006.01)
  *B66F 17/00* (2006.01)
(52) U.S. Cl.
  CPC .......... *B66F 11/046* (2013.01); *B66F 11/044* (2013.01); *B66F 17/006* (2013.01)
(58) Field of Classification Search
  CPC ...... B66F 11/046; B66F 11/044; B66F 17/006
  See application file for complete search history.

(56) References Cited

U.S. PATENT DOCUMENTS

| | | | |
|---|---|---|---|
| 5,669,517 | A | 9/1997 | Donaldson et al. |
| 5,899,347 | A | 5/1999 | Cullity |
| 6,109,463 | A | 8/2000 | Cullity |
| 6,341,665 | B1 | 1/2002 | Zhou et al. |
| 2012/0057956 | A1* | 3/2012 | Shirao ..................... E02F 3/433 414/707 |
| 2012/0211301 | A1 | 8/2012 | Clark et al. |
| 2013/0313042 | A1 | 11/2013 | Freeman et al. |
| 2014/0271073 | A1* | 9/2014 | Mueller ................. E02F 9/2235 414/815 |
| 2014/0326542 | A1* | 11/2014 | Dammeyer ............... B66F 9/20 187/234 |
| 2020/0240115 | A1 | 7/2020 | Kondo et al. |
| 2021/0035428 | A1 | 2/2021 | Baillargeon et al. |
| 2021/0048117 | A1 | 2/2021 | Schrader |
| 2022/0403623 | A1* | 12/2022 | Wu ........................ E02F 9/2203 |

OTHER PUBLICATIONS

International Search Report and Written Opinion for Application No. PCT/US2022/048342, dated Feb. 9, 2023, 14 Pages.

\* cited by examiner

*Primary Examiner* — Kamini S Shah
*Assistant Examiner* — Zachary Andrew Cain
(74) *Attorney, Agent, or Firm* — BROOKS KUSHMAN P.C.

(57) ABSTRACT

A system and method for controlling a movement function of a machine having first and second components. A controller commands delivery of an initial threshold current to a coil for opening a valve in response to a user request to perform the movement function. The controller determines a difference between a measured value of a parameter associated with the first component and a target value. When a change in the difference during a first period exceeds a first change threshold, the controller commands delivery of a reduced threshold current less than the initial threshold current. When a change in the difference during a second period fails to exceed a second change threshold, the controller commands delivery of an increased threshold current greater than the initial threshold current. The reduced or increased threshold current when delivered to the coil controls movement of the first component relative to the second.

20 Claims, 5 Drawing Sheets

SYSTEM AND METHOD FOR CONTROLLING A MOVEMENT FUNCTION OF A MACHINE

TECHNICAL FIELD

The following relates to a system and method for controlling a movement function of a machine, such as a boom lift.

BACKGROUND

A vehicle, such as an aerial work platform or crane, may be provided with a boom assembly and such a vehicle may be referred to as a boom lift. Examples of such vehicles are disclosed in U.S. Pat. Nos. 5,669,517; 5,899,347; 6,109,463; and 6,341,665.

SUMMARY

According to one non-limiting exemplary embodiment described herein, a system is provided for controlling a movement function of a machine comprising first and second components by adjustment of a threshold value of a current delivered to a coil associated with a proportional valve for use in performing the movement function. The system comprises a controller configured to command delivery of an initial threshold current to the coil for opening the valve in response to a user request to perform the movement function of the machine, and a sensor configured to provide a measured value of a parameter associated with the first component. The controller is further configured to determine a difference between the measured value of the parameter and a target value of the parameter. The controller is also further configured to, when a change in the difference between the measured value and the target value during a first time period exceeds a first change threshold value, command delivery of a reduced threshold current to the coil for opening the valve, wherein the reduced threshold current is less than the initial threshold current. The controller is also further configured to, when a change in the difference between the measured value and the target value during a second time period fails to exceed a second change threshold value, command delivery of an increased threshold current to the coil for opening the valve, wherein the increased threshold current is greater than the initial threshold current. The reduced threshold current or the increased threshold current when delivered to the coil for opening the valve controls movement of the first component of the machine relative to the second component of the machine.

According to another non-limiting exemplary embodiment described herein, a method is provided for controlling a movement function of a machine comprising first and second components by adjustment of a threshold value of a current delivered to a coil associated with a proportional valve for use in performing the movement function. The method comprises delivering an initial threshold current to the coil for opening the valve in response to a user request to perform the movement function of the machine, and determining a difference between a measured value of a parameter associated with the first component and a target value of the parameter. The method further comprises, when a change in the difference between the measured value and the target value during a first time period exceeds a first change threshold value, delivering a reduced threshold current to the coil for opening the valve, wherein the reduced threshold current is less than the initial threshold current. The method further comprises, when a change in the difference between the measured value and the target value during a second time period fails to exceed a second change threshold value, delivering an increased threshold current to the coil for opening the valve, wherein the increased threshold current is greater than the initial threshold current. The reduced threshold current or the increased threshold current when delivered to the coil for opening the valve controls movement of the first component of the machine relative to the second component of the machine.

According to another non-limiting exemplary embodiment described herein, a non-transitory computer readable storage medium is provided having stored computer executable instructions for controlling a movement function of a machine comprising first and second components and a controller by adjustment of a threshold value of a current delivered to a coil associated with a proportional valve for use in performing the movement function. The instructions when executed cause the controller to command delivery of an initial threshold current to the coil for opening the valve in response to a user request to perform the movement function of the machine, and determine a difference between a measured value of a parameter associated with the first component and a target value of the parameter. The instructions when executed further cause the controller to, when a change in the difference between the measured value and the target value during a first time period exceeds a first change threshold value, command delivery of a reduced threshold current to the coil for opening the valve, wherein the reduced threshold current is less than the initial threshold current. The instructions when executed further cause the controller to, when the change in the difference between the measured value and the target value during a second time period fails to exceed a second change threshold value, command delivery of an increased threshold current to the coil for opening the valve, wherein the increased threshold current is greater than the initial threshold current. The reduced threshold current or the increased threshold current when delivered to the coil for opening the valve controls movement of the first component of the machine relative to the second component of the machine.

A detailed description of these and other non-limiting exemplary embodiments of a control system and method for controlling a movement function of a machine is set forth below together with the accompanying drawings.

DETAILED DESCRIPTION

Figure 1:
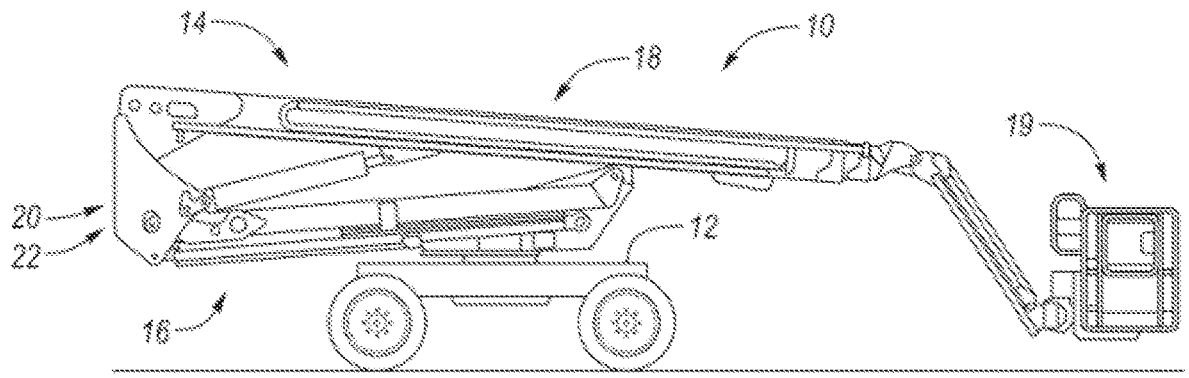
FIG. 1 is a side view of a vehicle including a non-limiting exemplary boom assembly according to the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art.

With reference to the Figures, a more detailed description of non-limiting exemplary embodiments of system and method for controlling a movement function of a machine will be provided. For ease of illustration and to facilitate understanding, like reference numerals may be used herein for like components and features throughout the drawings.

Figure 3:
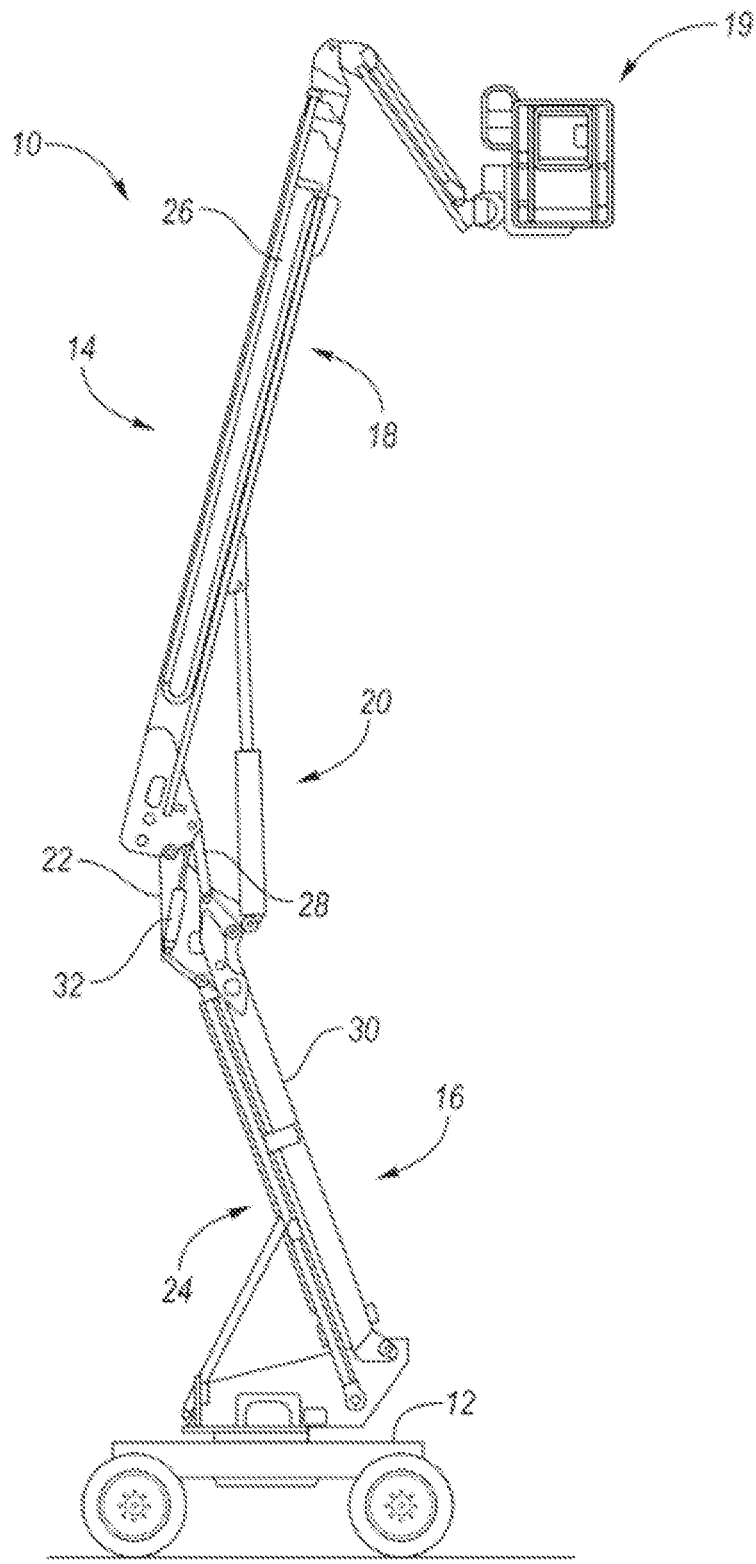
FIG. 3 is a side view of the vehicle of FIG. 1 with the boom assembly moved to a raised position.
Figure 4:
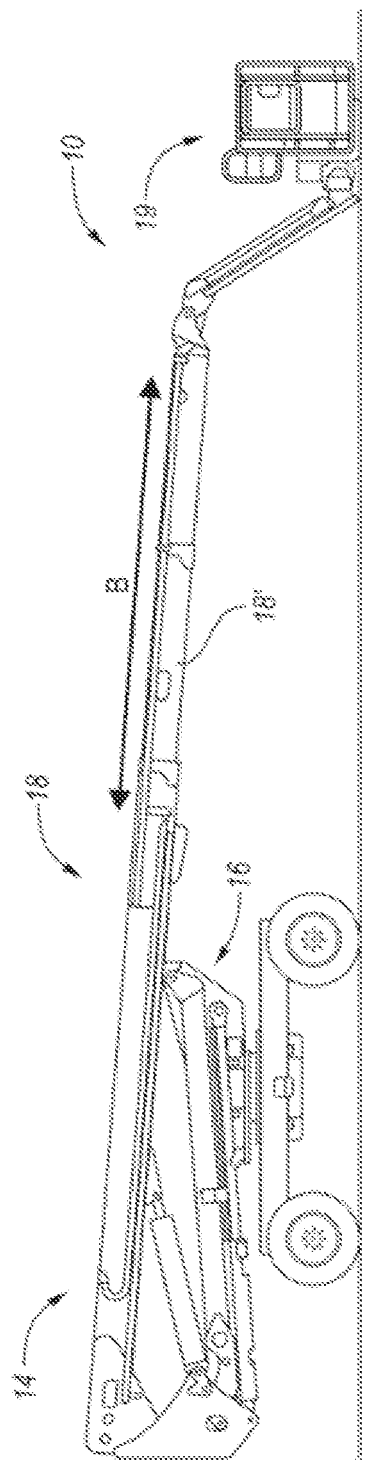
FIG. 4 is a side view of the vehicle of FIG. 1 with the boom assembly moved to an extended position.

FIG. 1 shows a vehicle 10 according to the present disclosure, which may be an aerial work platform, or any other vehicle including a lifting device. The vehicle 10 includes a base, such as a frame or chassis 12; one or more movement facilitating members, such as wheels or tracks, movably attached to the chassis 12; a drive system (not shown), such as an engine or one or more electric motors, for driving the movement facilitating members; and a boom assembly 14 according to the present disclosure mounted on the chassis 12. The boom assembly 14 is movable from a lowered position, shown in FIG. 1, to an intermediate position shown in FIG. 2, and then to a raised position, shown in FIG. 3. In addition, or as an alternative, one or more portions of the boom assembly 14 may be movable between retracted and extended positions along line B, as shown in FIG. 4.

The boom assembly 14 may include any suitable components, equipment, or configuration for moving between the lowered and raised positions, up or down positions, and/or extended or retracted positions. In the embodiment shown in FIGS. 1-3, for example, the boom assembly 14 includes a lower boom structure 16, which may include one or more boom portions, members, or arms. The lower boom assembly 16 is pivotally attached to the chassis 12 so that the lower boom structure 16 is pivotable with respect to the chassis 12 between a lowered position, shown in FIG. 1, and a raised position, shown in FIG. 3. The boom assembly 14 also includes an upper boom structure 18, which may include one or more boom portions, members, or arms. The upper boom structure 18 is pivotally attached to the lower boom structure 16 so that the upper boom structure 18 is pivotable with respect to the lower boom structure 16 between a lowered position, shown in FIG. 1, and a raised position, shown in FIG. 3. As shown in FIG. 4, the upper boom structure 18 may include a telescoping portion, member, or arm 18' to enable movement of the upper boom structure 18 between retracted and extended positions. The illustrated embodiment further includes a work platform 19 pivotably attached to the upper boom structure 18. The work platform 19 may be configured to receive one or more workers and other cargo, such as one or more toolboxes. The work platform 19 may also include suitable controls for operating the boom assembly 14 and/or other aspects of the vehicle 10, such as the drive system for moving the vehicle 10. The illustrated embodiment further includes a boom turntable 17 rotatably attached to a base (such as the chassis 12) for clockwise/counterclockwise rotation of the boom assembly 14. In another embodiment, the boom assembly 14 may include a forklift or any other suitable support or lift component attached to the upper boom structure 18.

Figure 2:
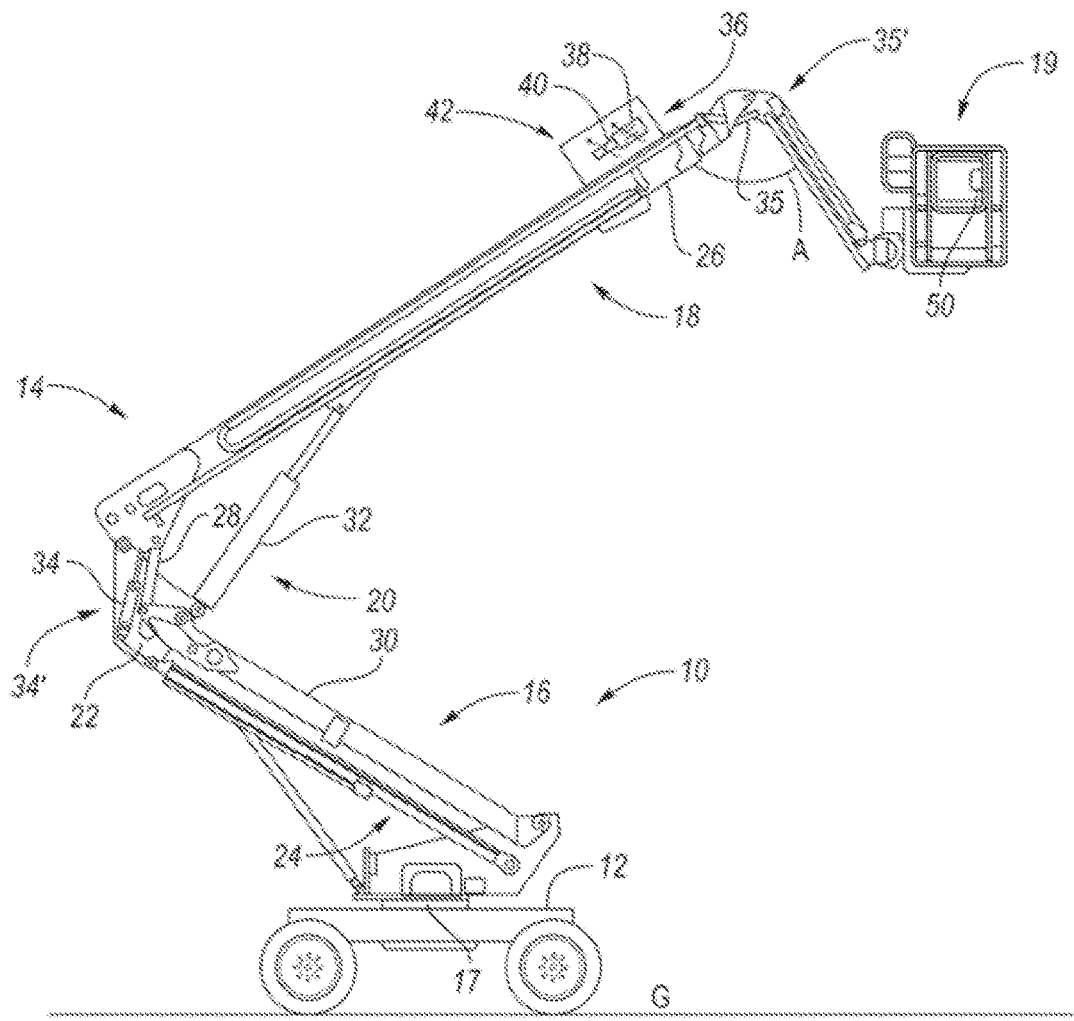
FIG. 2 is a side view of the vehicle of FIG. 1 with the boom assembly moved to an intermediate position.

Referring to FIG. 2, the boom assembly 14 also includes a pivot arrangement 20 for pivotally connecting the lower boom structure 16 to the upper boom structure 18. For example, the pivot arrangement 20 may include a pivot member, such as a mid-pivot 22, that is pivotally connected to a boom member, such as a lower riser boom 24, of the lower boom structure 16 and a boom member, such as a primary boom 26, of the upper boom structure 18. The pivot arrangement 20 may further include a link 28 having one end that is pivotably connected to a second boom member, such as an upper riser boom 30, of the lower boom structure 16, and an opposite end that is pivotably connected to the primary boom 26 of the upper boom structure 18. In addition, the pivot arrangement 20 may include a drive member or actuator, such as a cylinder 32 (e.g., a piston connected to a piston rod, and a corresponding chamber or cylinder barrel that receives the piston), connected to the mid-pivot 22 and the primary boom 26. As the cylinder 32 is extended (e.g., when the piston rod is moved outwardly with respect to the cylinder barrel), the primary boom 26 rises and pulls on the link 28, which pulls on the upper riser boom 30 of the lower boom structure 16, thereby moving the boom assembly 14 from the lowered position, shown in FIG. 1, to the raised position, shown in FIG. 3. When the cylinder 32 is retracted (e.g., when the piston rod is moved inwardly with respect to the cylinder barrel), the boom assembly 14 may move from the raised position, shown in FIG. 3, to the lowered position, shown in FIG. 1. The lower riser boom 24 may also act as a timing member as the boom assembly 14 moves between the lowered and raised positions.

In addition, the boom assembly 14 may include one or more additional drive members for adjusting position of the work platform 19, or other suitable component attached to the upper boom structure 18, to keep the work platform 19 or other component in a desired orientation, such as level. In the illustrated embodiment, the boom assembly 14 includes a master cylinder 34 connected to the primary boom 26 and the mid-pivot 22, and a slave cylinder 35 associated with the master cylinder 34 and connected to the primary boom 26 and the work platform 19, and the cylinders 34, 35 are operable together to adjust position of the work platform 19 or other component attached to the upper boom structure 18 when the boom assembly 14 is moved between the lowered and raised positions. In that regard, it is noted that the vehicle 10, chassis 12, and/or boom assembly 14 may include appropriate systems (not shown), such as a hydraulic system including one or more pumps and an electrical system including one or more motors, for driving, powering, operating, and/or controlling the components, functions, and/or operations described herein With reference to FIG. 2, the boom assembly 14 may include an electronic leveling machine 36 configured to maintain the platform 19 in a level orientation relative to ground G as the boom assembly 14 moves between the starting, intermediate, and raised positions shown in FIGS. 1-3, or between extended and retracted positions shown in FIG. 4. While shown in FIG. 2 as attached to the upper boom structure 18, the leveling machine 36 may alternatively be attached or mounted to or on, located at, or integrated in or on any component or portion of the vehicle 10, such as the chassis 12 or platform 19. In that regard, it is noted that the leveling machine 36 is illustrated schematically in a simplified and exaggerated fashion, which illustration is exemplary only. The leveling machine 36 may comprise or be configured to cooperate with a suitable hydraulic system for moving the platform 19 relative to the boom assembly 14, which movement is performed to maintain the platform 19 in a level orientation relative to ground G as the boom assembly 14 moves in response to a user request to perform a movement function, such as a boom up/down movement function (see FIGS. 1-3) or a boom extension/retraction movement function (see FIG. 4).

Such a hydraulic system and or leveling machine 36 may include a proportional valve 38 for controlling flow of a hydraulic fluid for use in movement of the platform 19 relative to the boom assembly 14 and/or the upper boom structure 18, including any boom portion, member, or arm thereof. The proportional valve 38 may be opened and closed by energizing or delivering an electrical current to a coil 40 of a solenoid 42 associated with the valve 38, where the degree or amount of opening of the valve 38 is generally proportional to the current delivered to the coil 40. More specifically, an initial threshold current delivered to the coil 40 serves to begin to open the valve 38 to allow an initial flow of hydraulic fluid to move the platform 19, and the valve 38 proceeds to a fully opened position to allow a greater flow of hydraulic fluid as the level or amount of current delivered to the coil 40 ramps up or increases over time. This is in contrast to a flow function enabled by a digital flow valve having only open or closed states.

As seen in FIG. 2, a controller 50 may be provided to control or command delivery of current to the coil 40. In that regard, the controller 50 may be provided in communication with one or more switches (not shown) to active/deactivate electrical power to the coil 40 and thereby operate the valve 38. While shown in FIG. 2 located at the platform 19, it is noted that the controller 50 may alternatively be located or mounted at or on, or integrated with or in, any component of the vehicle 10, such as the chassis 12 or boom assembly 14. The controller 50 may alternatively comprise one or more controllers and/or circuitry and appropriate software located at or distributed among multiple components of the vehicle 10. It is also noted that the controller 50 may be provided in electrical communication over an appropriate electrical communication system (wired and/or wireless) with other components of the vehicle 10, such as a battery (not shown), for powering the controller 50, and/or receiving signals at the controller 50 which may comprise information from one or more sensors or commands from a user as described herein, and/or transmitting signals from the controller 50 such as commands to deliver current to the coil 40 as described herein.

One of the most common issues on existing electronic leveling machines is that the initial current level required to begin opening the valve 38 in order to level platform 19 during a movement function may change depending on various factors. As a result, such an initial threshold current level needs to be adjusted often so the platform 19 maintains level accurately. If the initial threshold current level is not set correctly, the platform 19 can lag behind as a user moves the boom assembly 14 up or down. This can be uncomfortable for the user and will need to be manually corrected by the user to bring the platform 19 back to level. The initial threshold current level is factory set initially, and thereafter any resetting, change, or adjustment of the initial threshold current level requires a service technician to go into the field and adjust it manually.

As previously described, the command to start movement for a movement function controlled, facilitated, or enabled by a proportional flow valve must start from an initial threshold current level and then ramp up to its target current value for a smooth performance of the movement function. As also previously described, such an initial threshold current value can change over time based or depending on various machine and ambient parameters like age of the valve, ambient temperature, hydraulic oil temperature, load, etc.

The present disclosure provides a feature or features that will increase or decrease (i.e., adjust) the initial threshold current level utilized or employed based on the amount of motion detected in a predetermined amount of time. The present disclosure thereby provides automatic and/or active calibration of the initial threshold current level, automatically accounting for the ambient parameters noted. The new initial threshold current value may also be used as the new starting value when the movement function is requested again by a user.

It is noted that the initial threshold current level is the minimum amperage (which may be denoted in milliamperes) commanded by the controller 50 or control system to the output coil 40 that will cause the proportional flow valve 38 to start opening to allow flow of hydraulic fluid. It is further noted that one or more angle sensors measures an angle of the platform 19 with respect to the boom angle, shown as A in FIG. 2. In that regard, a boom angle sensor 34' may be located or integrated with master cylinder 34, and a platform angle sensor 35' may be located or integrated with slave cylinder 35. Such an angle of the platform 19, which may also be referred to as a platform angle, may be reported, provided, generated, or outputted by the sensor(s) in 100ths of a degree (°).

The present disclosure calculates the minimum amperage value required that causes sufficient motion of the platform level function. Movement of the platform 19 occurs automatically anytime the primary boom 14 moves up or down to maintain a user set platform angle. As a result, the feature or features of the present disclosure are active anytime the primary boom 14 is moving up or down (or alternatively or in addition during any boom extension/retraction movement).

More particularly, when a user requests up/down movement of the boom 14, the controller 50 or control system calculates the difference between the actual platform angle measured and reported, generated, outputted, or provided by the sensor or sensors 34', 35' (which may be referred to as a measured parameter) and the platform angle requested by the user. In that regard, the platform angle requested by the user may comprise a leveling position initially set by user or captured by the machine at start-up, and may be referred to as a target, target value, target angle, target position, or target parameter value. In one embodiment, if the difference between the measured platform angle and the target position is less than 0.5°, then active threshold calibration according to the present disclosure may be initiated. Alternatively, if the difference is greater than 0.5°, then the initial threshold current level that is currently in use may be maintained. In that event, it is noted that the level or amount of current delivered to the coil 40 will be increased quickly to account for greater error (i.e., greater than 0.5° difference between the measured platform angle and the target position). It is also noted that threshold value of 0.5° for the difference between the measured platform angle and the target platform angle is exemplary only, and other values may alternatively be selected or designated and utilized or employed. In that regard, for example, the difference between the measured value and the target value may preferably be any value from or within the range of or from 0° to 0.5°, more preferably any value from or within the range of or from 0° to 0.3°, and more preferably 0.3°.

According to one non-limiting embodiment of the present disclosure, when an output current is commanded to the coil 40 associated with the valve 38 for use in leveling the platform 19, if the platform angle changes by more than 0.03° in less than 100 milliseconds, such a change is deemed too fast, as it may be uncomfortable for a user. In that regard, the starting value for the initial threshold current level may be factory set at a default or another value, or may be manually adjusted in the field. For example, a default value for the initial threshold current level may be 690 milliamperes for platform up movement and 680 milliamperes for platform down movement, although other values may be employed for such initial threshold current levels. As a result, when an output current is commanded to the coil 40 associated with the valve 38 for use in leveling the platform 19, if the platform angle changes by more than 0.03° in less than 100 ms, the threshold current level is too high and may be reduced by 20 mA (e.g., given the default values previously noted, the threshold current level may be reduced to 670 milliamperes for platform up movement, or to 660 milliamperes for platform down movement). It is also noted that the threshold of 0.03°, the time period of 100 milliseconds, initial threshold current levels of 690/680 milliamperes (for up/down movement), and the current reduction amount of 20 milliamperes are exemplary only, and other change thresholds, time periods, threshold current levels, and/or current reduction amounts may alternatively be selected or designated and utilized or employed. It is further noted that the reduction amount applied to the threshold current level for platform up movement may be the same as or different than the reduction amount applied to the threshold current level for platform down movement. Moreover, the platform angle change threshold, for example, may preferably be any value from or within the range of or from 0.02° to 0.05°, more preferably any value from or within the range of or from 0.03° to 0.05°, and more preferably 0.03°. The time period for the platform angle change, for example, may preferably be any value from or within the range of or from 100 to 200 milliseconds, more preferably any value from or within the range of or from 100 to 150 milliseconds, and more preferably 100 milliseconds. The initial threshold current levels of 690/680 milliamperes (for up/down movement), for example, may preferably be any value from or within the range of or from 600 to 750 milliamperes, more preferably from or within the range of or from 620 to 730 milliamperes, and more preferably 690 milliamperes for platform up movement and 680 milliamperes for platform down movement. The current reduction amount, for example, may preferably be an amount from or within the range of or from 5 to 30 milliamperes, more preferably 10 to 20 milliamperes, and more preferably 20 milliamperes.

According to another non-limiting embodiment of the present disclosure, when an output current is commanded to the coil 40 associated with the valve 38 for use in leveling the platform 19, if the platform angle has not changed even after or within 1.5 seconds, such a lack of change is deemed too slow, as again it may be uncomfortable for a user. As a result, in such an event, the threshold current level is too low and may be increased by 20 milliamperes (e.g., given the default values previously noted, the threshold current level may be increased to 710 milliamperes for platform up movement, or to 700 milliamperes for platform down movement). It is noted that the threshold of 0° (i.e., no change in the platform angle), the time period of 1.5 seconds, initial threshold current levels of 690/680 milliamperes, and the current increase amount of 20 milliamperes are exemplary only, and other change thresholds, time periods, threshold current levels, and/or current increase amounts may alternatively be employed. It is also noted that the increased amount applied to the threshold current level for platform up movement may be the same as or different than the increased amount applied to the threshold current level for platform down movement. Moreover, the platform angle change threshold may, for example, preferably be any value from or within the range of or from 0° to 0.02°, more preferably any value from or within the range of or from 0° to 0.01°, and more preferably 0°. The time period for the platform angle change, for example, may preferably be any value from or within the range of or from 750 milliseconds to 1.5 seconds, more preferably any value from or within the range of or from 1 to 1.5 seconds, and more preferably 1.5 seconds. The initial threshold current levels of 690/680 milliamperes (for up/down movement), for example, may preferably be any value from or within the range of or from 600 to 750 milliamperes, more preferably from or within the range of or from 620 to 730 milliamperes, and more preferably 690 milliamperes for platform up movement and 680 milliamperes for platform down movement. The current reduction amount, for example, may preferably be an amount from or within the range of or from 5 to 30 milliamperes, more preferably 10 to 20 milliamperes, and more preferably 20 milliamperes.

According to non-limiting embodiments of the present disclosure, such a new, adjusted, calibrated, or re-calibrated (whether increased or decreased) threshold current level may be used as the starting or initial threshold current level when the user stops the boom up/down motion and subsequently requests boom up/down motion again. Furthermore, if the difference between the actual and target platform angle is less than 0.5° during such a new boom movement request, then the calibration according to the present disclosure may be initiated again and the threshold current level may be adjusted accordingly. It is noted again that threshold value of 0.5° for the difference between the measured platform angle and the target platform angle is exemplary only, and other values may alternatively be selected or designated and utilized or employed. In that regard, for example, the difference between the measured value and the target value may preferably be any value from or within the range of or from 0° to 0.5°, more preferably any value from or within the range of or from 0° to 0.3°, and more preferably 0.3°.

In such a fashion, according to the present disclosure, the threshold current level or levels required to provide for leveling of the platform 19 may be adjusted as and when, as previously described, the conditions change based or depending on various machine and ambient parameters like age of the valve, ambient temperature, hydraulic oil temperature, load, etc. As a result, the present disclosure provides optimum platform leveling performance without requiring manual setting of the thresholds and which is invisible to the user.

Figure 5:
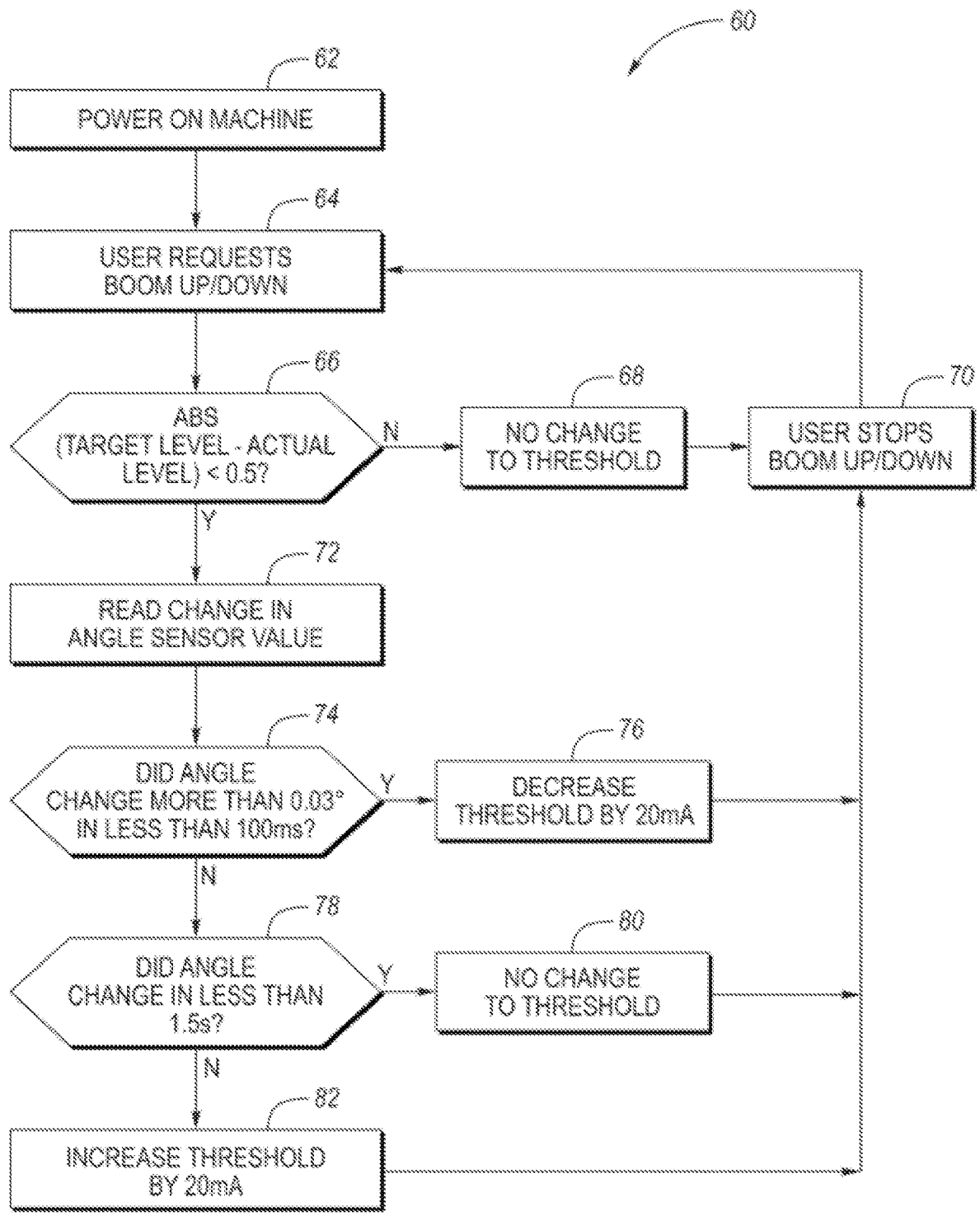
FIG. 5 is an exemplary flowchart of a non-limiting exemplary embodiment of the present disclosure.

Referring next to FIG. 5, an exemplary flowchart of one non-limiting exemplary embodiment of the present disclosure is shown. As seen therein, and with continuing reference to FIGS. 1-4 and the description accompanying those figures, a method 60 according to the present disclosure may begin at power-on 62 of a machine, such as the vehicle 10 comprising a boom lift, and may proceed with a user request 64 for boom up or down movement (i.e., a boom up/down movement function). Thereafter, a determination 66 may be made (such as by the controller 50) whether the (absolute value) difference between the target level (or target value, or target position) of the platform angle and the measure platform angle is less than 0.5°. If not (i.e., such a difference is greater than) 0.5°, then no change may be made 68 to the initial threshold current value for the current delivered to the coil 40 of the solenoid 42 for opening the proportional valve 38 for use in maintain a level orientation of the platform 19 until the user stops 70 the up or down movement of the boom. Thereafter, when the user subsequently requests 64 up or down movement of the boom again, the determination step 66 may be repeated. Once again, it is noted that threshold value of 0.5° for the difference between the measured platform angle and the target platform angle is exemplary only, and other values may alternatively be selected or designated and utilized or employed. In that regard, for example, the difference between the measured value and the target value may preferably be any value from or within the range of or from 0° to 0.5°, more preferably any value from or within the range of or from 0° to 0.3°, and more preferably 0.3°.

Otherwise, if the (absolute value) difference between the target level (or target value, or target position) of the platform angle and the measure platform angle is less than 0.5°, then the angle sensor or sensors 34', 35' may read, sense, or measure and report, provide, generate, or output a measured platform angle, and a change in the difference between the target level (or target value, or target position) of the platform angle and the measured platform angle may be determined 72 (such as by the controller 50). Thereafter, it may be determined 74 (such as by the controller 50) whether that difference has changed more than 0.03° in less than 100 milliseconds. If so, then the initial threshold current value for the current delivered to the coil 40 of the solenoid 42 for opening the proportional valve 38 for use in maintaining a level orientation of the platform 19 may be reduced or decreased 76 by 20 milliamperes until the user stops 70 the up or down movement of the boom. Thereafter, when the user subsequently requests 64 up or down movement of the boom again, the determination 66, read 72, and determination 74 steps may be repeated. Once again, the default value for the initial threshold current level may be 690 milliamperes for platform up movement and 680 milliamperes for platform down movement, although other values may be employed for such initial threshold current levels. As a result, a reduction or decrease in the initial threshold current level by 20 milliamperes may reduce the threshold current level to 670 milliamperes for platform up movement, or to 660 milliamperes for platform down movement. It is also noted again that the threshold of 0.03°, the time period of 100 milliseconds, the initial threshold current levels of 690/680 milliamperes, and the current reduction amount of 20 milliamperes are exemplary only, and other change thresholds, time periods, initial threshold current levels, and/or current reduction amounts may alternatively be employed. It is further noted that the reduction amount applied to the threshold current level for platform up movement may be the same as or different than the reduction amount applied to the threshold current level for platform down movement. Moreover, the platform angle change threshold, for example, may preferably be any value from or within the range of or from 0.02° to 0.05°, more preferably any value from or within the range of or from 0.03° to 0.05°, and more preferably 0.03°. The time period for the platform angle change, for example, may preferably be any value from or within the range of or from 100 to 200 milliseconds, more preferably any value from or within the range of or from 100 to 150 milliseconds, and more preferably 100 milliseconds. The initial threshold current levels of 690/680 milliamperes (for up/down movement), for example, may preferably be any value from or within the range of or from 600 to 750 milliamperes, more preferably from or within the range of 620 to 730 milliamperes, and more preferably 690 milliamperes for platform up movement and 680 milliamperes for platform down movement. The current reduction amount, for example, may preferably be an amount from or within the range of or from 5 to 30 milliamperes, more preferably 10 to 20 milliamperes, and more preferably 20 milliamperes.

Alternatively, if the difference between the target level (or target value, or target position) of the platform angle and the measure platform angle did not change more than 0.03° in less than 100 milliseconds, then it may be determined 78 (such as by the controller 50) whether that difference has changed at all within or in less than 1.5 seconds. If so, then no change may be made 80 to the initial threshold current value for the current delivered to the coil 40 of the solenoid 42 for opening the proportional valve 38 for use in maintain a level orientation of the platform 19 until the user stops 70 the up or down movement of the boom. Thereafter, when the user subsequently requests 64 up or down movement of the boom again, the determination 66, read 72, determination 74, and determination 78 steps may be repeated.

Otherwise, if the difference between the target level (or target value, or target position) of the platform angle and the measured platform angle has not changed within or in less than 1.5 seconds, then the initial threshold current value for the current delivered to the coil 40 of the solenoid 42 for opening the proportional valve 38 for use in maintaining a level orientation of the platform 19 may be increased 82 by 20 milliamperes until the user stops 70 the up or down movement of the boom. Thereafter, when the user subsequently requests 64 up or down movement of the boom again, the determination 66, read 72, determination 74, and determination 78 steps may be repeated. Once again, the default value for the initial threshold current level may be 690 milliamperes for platform up movement and 680 milliamperes for platform down movement, although other values may be employed for such initial threshold current levels. As a result, an increase in the initial threshold current level by 20 milliamperes may increase the threshold current level to 710 milliamperes for platform up movement, or to 700 milliamperes for platform down movement. It is also noted again that the threshold of 0° (i.e., no change in the platform angle), the time period of 1.5 seconds, the initial threshold current levels of 690/680 milliamperes, and the current increase amount of 20 milliamperes are exemplary only, and other change thresholds, time periods, initial threshold current levels, and/or current increase amounts may alternatively be employed. It is noted once again that the amount of increase applied to the threshold current level for platform up movement may be the same as or different than the amount of increase applied to the threshold current level for platform down movement. It is also noted that the amount of increase applied to any threshold current level may be the same as or different than any reduction amount previously described herein which may be applied to any threshold current level. It is further noted that the increased amount applied to the threshold current level for platform up movement may be the same as or different than the increased amount applied to the threshold current level for platform down movement. Moreover, the platform angle change threshold may, for example, preferably be any value from or within the range of or from 0° to 0.02°, more preferably any value from or within the range of or from 0° to 0.01°, and more preferably 0°. The time period for the platform angle change, for example, may preferably be any value from or within the range of or from 750 milliseconds to 1.5 seconds, more preferably any value from or within the range of or from 1 to 1.5 seconds, and more preferably 1.5 seconds. The initial threshold current levels of 690/680 milliamperes (for up/down movement), for example, may preferably be any value from or within the range of or from 600 to 750 milliamperes, more preferably from or within the range of 620 to 730 milliamperes, and more preferably 690 milliamperes for platform up movement and 680 milliamperes for platform down movement. The current reduction amount, for example, may preferably be an amount from or within the range of or from 5 to 30 milliamperes, more preferably 10 to 20 milliamperes, and more preferably 20 milliamperes.

While one embodiment described herein is implemented to calculate the threshold current level for use in leveling platform 19 during a boom up/down movement function, the present disclosure can also be used for or applied to other movement functions involving a proportional flow valve as well. For example, the present disclosure may alternatively or in addition be used for boom extension/retraction movement functions (see FIG. 4). In that regard, the initial threshold current level for a proportional flow valve for use with or to accomplish such a boom extension/retraction movement function is currently set manually but may be automated according to the present disclosure.

Figure 6:
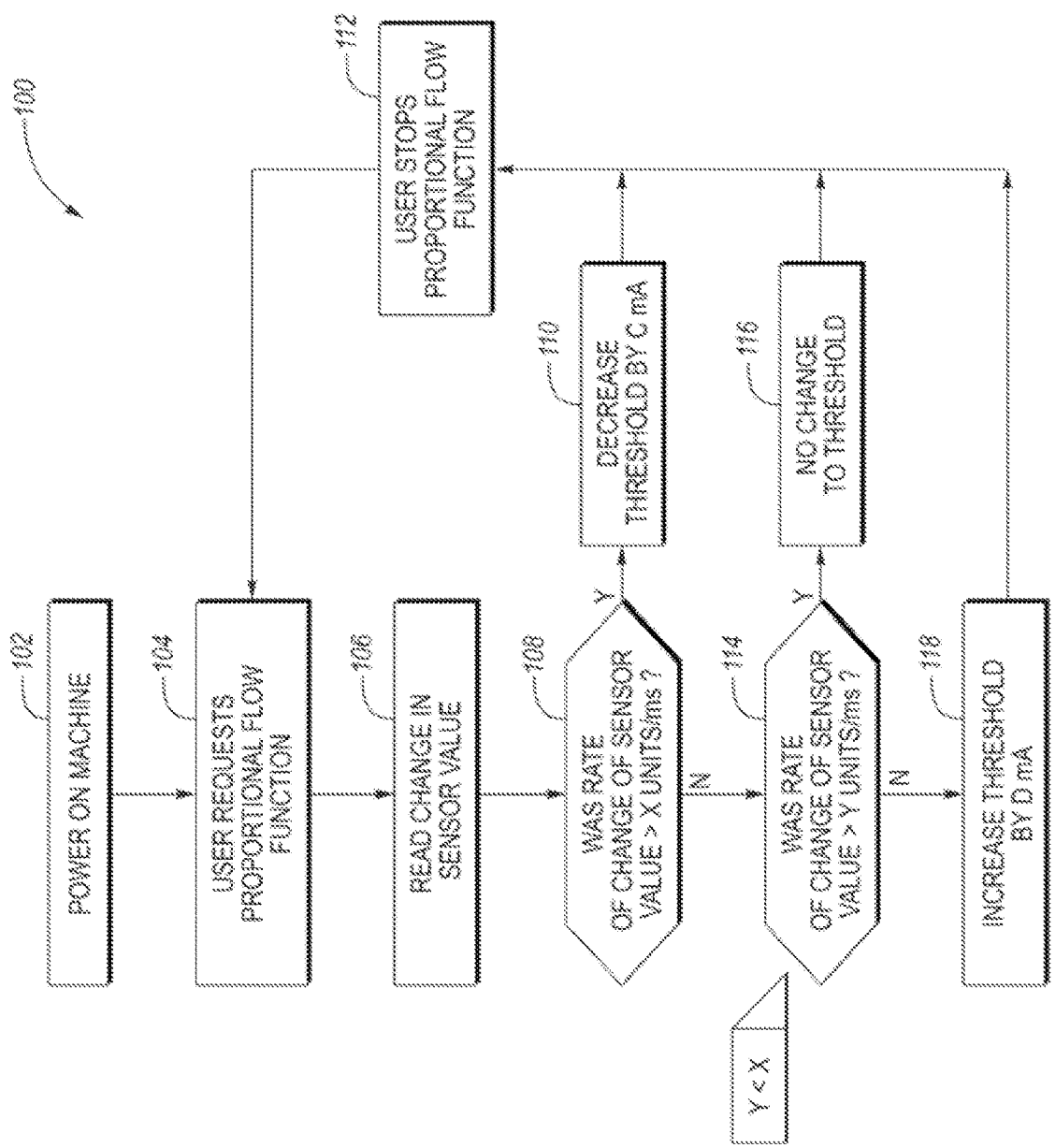
FIG. 6 is an exemplary flowchart of another non-limiting exemplary embodiment of the present disclosure.

In that regard, referring next to FIG. 6, an exemplary flowchart of another non-limiting exemplary embodiment of the present disclosure is shown. As seen therein, and with continuing reference to FIGS. 1-4 and the description accompanying those figures, a method 100 according to the present disclosure may begin at power-on 102 of a machine, such as the vehicle 10 comprising a boom lift, and may proceed with a user request 104 for a movement function of the machine associated with a proportional flow valve provided for use in performing such a movement function. Such a movement function may be the boom up/down movement function previously described herein, or alternatively may be any other type of movement function of a machine, such as extension/retraction of a boom (see FIG. 4), boom turntable rotation (clockwise/counter-clockwise) relative to a base (such as chassis 12), drive or propulsion (forward/reverse) of a machine (i.e., rotation of an axle relative to the machine chassis), or any other movement function of a machine associated with a proportional flow valve provided for use in performing such a movement function and therefore having an associated threshold current level required to begin opening of such a proportional flow valve. In that regard, the exemplary flowchart illustrated in FIG. 6 illustrates a more generic non-limiting exemplary embodiment of the present disclosure.

After such a user request 104, a sensor or sensors may read, sense, or measure 106 and report, provide, generate, or output a measured parameter. In that regard, such a sensor or sensors may be angle sensors (e.g., 34', 35') as previously described, or may alternatively be any other type of sensor or sensors suitable for sensing an appropriate parameter associated with applicable movement functions of a machine (such as a position sensor measuring a position or length of extension/retraction (e.g., in inches) of the arm 18' illustrated in FIG. 4). Thereafter, it may be determined 108 (such as by the controller 50) whether a rate of change of such a measured parameter (i.e., a change in the units of the measured parameter over a selected or designated time period) exceeds a selected or designated first threshold (e.g., X units/millisecond). If so, then the initial threshold current value for the current delivered to the coil of the solenoid for opening the proportional valve for use in performing the applicable movement function of the machine may be reduced or decreased 110 by a selected or designated amount (e.g., C milliamperes) until the user stops 112 the requested movement of the machine. Thereafter, when the user subsequently requests 104 the movement function of the machine again, the read 106 and determination 108 steps may be repeated. It is noted that the selection or designation of any such parameter, parameter threshold, time period, initial threshold current value(s), and/or current reduction amount may be empirical and may be based on safety considerations and/or user comfort.

Alternatively, if the rate of change of such a measured parameter exceeds the selected or designated first threshold, then it may be determined 114 (such as by the controller 50) whether a rate of change of such a measured parameter (i.e., a change in the units of the measured parameter over a selected or designated time period) exceeds a second selected or designated threshold less than the first threshold (e.g., Y units/millisecond, where Y<X). If so, then no change may be made 116 to the initial threshold current value for the current delivered to the coil of the solenoid for opening the proportional valve for use in performing the applicable movement function of the machine until the user stops 112 the requested movement of the machine. Thereafter, when the user subsequently requests 104 the movement function of the machine again, the read 106, determination 108, and determination 114 steps may be repeated.

Otherwise, if the rate of changed of such a measured parameter fails to exceed the selected or designated second threshold, then the initial threshold current value for the current delivered to the coil of the solenoid for opening the proportional valve for use in performing the applicable movement function of the machine may be increased 118 by a selected or designated amount (e.g., D milliamperes) until the user stops 112 the requested movement of the machine. Thereafter, when the user subsequently requests 104 the movement function of the machine again, the read 106, determination 106, and determination 114 steps may be repeated. It is again noted that the selection or designation of any such parameter, parameter threshold, time period, initial threshold current value(s), and/or current increase amount may be empirical and may be based on safety considerations and/or user comfort. It is also noted that the amount of increase applied to any threshold current level may be the same as or different than any reduction amount previously described herein which may be applied to any threshold current level (i.e., C=D, or C/=D).

With continuing reference to FIGS. 1-6, the present disclosure provides a system for controlling a movement function of a machine comprising first and second components by adjustment of a threshold value of a current delivered to a coil associated with a proportional valve for use in performing the movement function. The system may comprise a controller configured to command delivery of an initial threshold current to the coil for opening the valve in response to a user request to perform the movement function of the machine, and a sensor configured to provide a measured value of a parameter associated with the first component. The controller may be further configured to determine a difference between the measured value of the parameter and a target value of the parameter. The controller may also be further configured to, when a change in the difference between the measured value and the target value during a first time period exceeds a first change threshold value, command delivery of a reduced threshold current to the coil for opening the valve, wherein the reduced threshold current is less than the initial threshold current. The controller may also be further configured to, when a change in the difference between the measured value and the target value during a second time period fails to exceed a second change threshold value, command delivery of an increased threshold current to the coil for opening the valve, wherein the increased threshold current is greater than the initial threshold current. The reduced threshold current or the increased threshold current when delivered to the coil for opening the valve controls movement of the first component of the machine relative to the second component of the machine.

As previously described, the machine may comprise a boom lift, the first component may comprise a platform, the second component may comprise a boom arm, and the movement function may comprise boom up/down motion, and movement of the first component relative to the second component includes a leveling of the platform. Alternatively, the machine may comprise a boom lift, the first component may comprise a first boom arm, the second component may comprise a second boom arm, and the movement function may comprise extension/retraction of the first or second boom arm. As is readily apparent, the present disclosure also provides a machine comprising a boom, a platform attached to the boom, and a system for controlling a movement function of the machine as described herein, wherein the movement function comprises boom up/down movement. The present disclosure further provides a machine comprising a first boom arm, a second boom arm, and a system for controlling a movement function of the machine as described herein, wherein the movement function comprises boom up/down movement. The present disclosure still further provides a machine comprising a boom turntable, a base, and a system for controlling a movement function of the machine as described herein, wherein the movement function comprises clockwise/counterclockwise rotation of the boom turntable. The present disclosure still further provides a machine comprising a chassis, an axle, and a system for controlling a movement function of the machine as described herein, wherein the movement function comprises forward/reverse propulsion of the machine.

As also previously described, the parameter may comprise an angle of the platform relative to the boom, and the controller may be further configured to command delivery of the reduced threshold current or the increased threshold current when the difference between the measured value and the target value may be from or within the range of or from 0° to 0.5°.

In one non-limiting exemplary embodiment, the parameter may comprise an angle of the platform relative to the boom, and the first change threshold value may be from or within the range of or from 0.02° to 0.05° and the first time period may be from or within the range of or from 100 to 200 milliseconds. In another non-limiting exemplary embodiment, the parameter may comprise an angle of the platform relative to the boom, and the second change threshold may be from or within the range of or from 0° to 0.02° and the second time period may be from or within the range of or from 750 milliseconds to 1.5 seconds.

As well, for platform up movement, the initial threshold current may be from or within the range of or from 600 to 750 milliamperes and each of the reduced threshold current and the increased threshold current may differ from the initial threshold current by an amount from or within the range of or from 5 to 30 milliamperes. For platform down movement, the initial threshold current may be from or within the range of or from 600 to 750 milliamperes and each of the reduced threshold current and the increased threshold current may differ from the initial threshold current by an amount from or within the range of or from 5 to 30 milliamperes.

It is also noted that the electronic leveling machine 36, solenoid 42 (including proportional valve 38 and coil 40), controller 50, and/or any other unit, control unit, control system, controller, control, component, console, algorithm, device, feature, system, functionality, module, arrangement, or the like described herein may comprise and/or be implemented in or by one or more appropriately programmed processors (e.g., one or more microprocessors including central processing units (CPU)) and associated memory and/or storage which may include and/or have stored thereon or therein data, firmware, operating system software, application software and/or any other suitable computer executable program, code or instructions executable by the processor(s) for controlling operation thereof and/or for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry) or individually packaged or assembled into a SoC (System-on-a-Chip). As well, several processors and various circuitry and/or hardware may be distributed among several separate components and/or locations.

In that regard, the components described herein, including but not limited to the electronic leveling machine 36, solenoid 42 (including proportional valve 38 and coil 40), and controller 50, may enable, facilitate, or be configured as described herein to provide a method for controlling a movement function of a machine, including performing the various steps, functions and/or operations described herein. As well, the memory and/or storage and executable programs, code, or instructions described herein, may enable, facilitate, or be configured as described herein to provide a non-transitory computer readable storage medium having stored computer executable instructions for controlling a movement function of a machine, to perform the particular algorithms represented by the various steps, functions and/or operations described and/or shown herein As is readily apparent from the foregoing, various non-limiting embodiments of an improved system and method for controlling a movement function of a machine have been described. While various embodiments have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A system for controlling a movement function of a machine comprising first and second components by adjustment of a threshold value of a current delivered to a coil associated with a proportional valve for use in performing the movement function, the system comprising:
 a controller configured to command delivery of an initial threshold current to the coil for opening the valve in response to a user request to perform the movement function of the machine; and
 a sensor configured to provide a measured value of a parameter associated with the first component;
 wherein the controller is further configured to
  determine a difference between the measured value of the parameter and a target value of the parameter,
  when a change in the difference between the measured value and the target value during a first time period exceeds a first change threshold value, command delivery of a reduced threshold current to the coil for opening the valve, wherein the reduced threshold current is less than the initial threshold current, when a change in the difference between the measured value and the target value during a second time period fails to exceed a second change threshold value, command delivery of an increased threshold current to the coil for opening the valve, wherein the increased threshold current is greater than the initial threshold current;

wherein, when the reduced threshold current or the increased threshold current is delivered to the coil for opening the valve, the first component of the machine is controlled to move relative to the second component of the machine.

2. The system of claim 1 wherein the machine comprises a boom lift, the first component comprises a platform, the second component comprises a boom arm, and the movement function comprises boom up/down motion, and wherein movement of the first component relative to the second component includes a leveling of the platform.

3. The system of claim 1 wherein:
the machine comprises a boom lift, the first component comprises a first boom arm, the second component comprises a second boom arm, and the movement function comprises extension/retraction of the first or second boom arm; or
the machine comprises a boom lift, the first component comprises a turntable, the second component comprises a base, and the movement function comprises clockwise/counterclockwise rotation of the turntable; or
the machine comprises a boom lift, the first component comprises an axle, the second component comprises a chassis, and the movement function comprises forward/reverse propulsion of the boom lift.

4. The system of claim 2 wherein the parameter comprises an angle of the platform relative to the boom, and wherein the controller is further configured to command delivery of the reduced threshold current or the increased threshold current when the difference between the measured value and the target value is within the range of 0° to 0.5°.

5. The system of claim 2 wherein the parameter comprises an angle of the platform relative to the boom, and wherein the first change threshold value is within the range of 0.02° to 0.05° and the first time period is within the range of 100 to 200 milliseconds.

6. The system of claim 2 wherein the parameter comprises an angle of the platform relative to the boom, and wherein the second change threshold is within the range of 0° to 0.02° and the second time period is within the range of 750 milliseconds to 1.5 seconds.

7. The system of claim 2 wherein:
for platform up movement, the initial threshold current is within the range of 600 to 750 milliamperes and each of the reduced threshold current and the increased threshold current differs from the initial threshold current by an amount within the range of 5 to 30 milliamperes; and
for platform down movement, the initial threshold current is within the range of 600 to 750 milliamperes and each of the reduced threshold current and the increased threshold current differs from the initial threshold current by an amount within the range of 5 to 30 milliamperes.

8. A machine comprising a boom, a platform attached to the boom, and a system for controlling a movement function of the machine according to claim 1, wherein the movement function comprises boom up/down movement.

9. A method for controlling a movement function of a machine comprising first and second components by adjustment of a threshold value of a current delivered to a coil associated with a proportional valve for use in performing the movement function, the method comprising:
delivering an initial threshold current to the coil for opening the valve in response to a user request to perform the movement function of the machine;
determining a difference between a measured value of a parameter associated with the first component and a target value of the parameter;
when a change in the difference between the measured value and the target value during a first time period exceeds a first change threshold value, delivering a reduced threshold current to the coil for opening the valve, wherein the reduced threshold current is less than the initial threshold current;
when a change in the difference between the measured value and the target value during a second time period fails to exceed a second change threshold value, delivering an increased threshold current to the coil for opening the valve, wherein the increased threshold current is greater than the initial threshold current;
wherein, when the reduced threshold current or the increased threshold current is delivered to the coil for opening the valve, the first component of the machine is controlled to move relative to the second component of the machine.

10. The method of claim 9 wherein the machine comprises a boom lift, the first component comprises a platform, the second component comprises a boom arm, and the movement function comprises boom up/down motion, and wherein movement of the first component relative to the second component includes a leveling of the platform.

11. The method of claim 9 wherein:
the machine comprises a boom lift, the first component comprises a first boom arm, the second component comprises a second boom arm, and the movement function comprises extension/retraction of the first or second boom arm; or
the machine comprises a boom lift, the first component comprises a turntable, the second component comprises a base, and the movement function comprises clockwise/counterclockwise rotation of the turntable; or
the machine comprises a boom lift, the first component comprises an axle, the second component comprises a chassis, and the movement function comprises forward/reverse propulsion of the boom lift.

12. The method of claim 9 wherein the parameter comprises an angle of the platform relative to the boom, and wherein delivering the reduced threshold current or the increased threshold current further comprises delivering the reduced threshold current or the increased threshold current when the difference between the measured value and the target value within the range of 0° to 0.5°.

13. The method of claim 9 wherein the parameter comprises an angle of the platform relative to the boom, wherein first change threshold value is within the range of 0.02° to 0.05° and the first time period is within the range of 100 to 200 milliseconds, and wherein the second change threshold is within the range of 0° to 0.02° and the second time period is within the range of 750 milliseconds to 1.5 seconds.

14. The method of claim 9 wherein:
for platform up movement, the initial threshold current is within the range of 600 to 750 milliamperes and each of the reduced threshold current and the increased threshold current differs from the initial threshold current by an amount within the range of 5 to 30 milliamperes; and for platform down movement, the initial threshold current is within the range of 600 to 750 milliamperes and each of the reduced threshold current and the increased threshold current differs from the initial threshold current by an amount within the range of 5 to 30 milliamperes.

15. A non-transitory computer readable storage medium having stored computer executable instructions for controlling a movement function of a machine comprising first and second components and a controller by adjustment of a threshold value of a current delivered to a coil associated with a proportional valve for use in performing the movement function, wherein the instructions when executed cause the controller to:

command delivery of an initial threshold current to the coil for opening the valve in response to a user request to perform the movement function of the machine;

determine a difference between a measured value of a parameter associated with the first component and a target value of the parameter;

when a change in the difference between the measured value and the target value during a first time period exceeds a first change threshold value, command delivery of a reduced threshold current to the coil for opening the valve, wherein the reduced threshold current is less than the initial threshold current;

when the change in the difference between the measured value and the target value during a second time period fails to exceed a second change threshold value, command delivery of an increased threshold current to the coil for opening the valve, wherein the increased threshold current is greater than the initial threshold current;

wherein, when the reduced threshold current or the increased threshold current is delivered to the coil for opening the valve, the first component of the machine is controlled to move relative to the second component of the machine.

16. The non-transitory computer readable storage medium of claim 15 wherein the machine comprises a boom lift, the first component comprises a platform, the second component comprises a boom arm, and the movement function comprises boom up/down motion, and wherein movement of the first component relative to the second component includes a leveling of the platform.

17. The non-transitory computer readable storage medium of claim 15 wherein:

the machine comprises a boom lift, the first component comprises a first boom arm, the second component comprises a second boom arm, and the movement function comprises extension/retraction of the first or second boom arm; or the machine comprises a boom lift, the first component comprises a turntable, the second component comprises a base, and the movement function comprises clockwise/counterclockwise rotation of the turntable; or the machine comprises a boom lift, the first component comprises an axle, the second component comprises a chassis, and the movement function comprises forward/reverse propulsion of the boom lift.

18. The non-transitory computer readable storage medium of claim 16 wherein the parameter comprises an angle of the platform relative to the boom, and wherein the instructions when executed further cause the controller to command delivery of the reduced threshold current or the increased threshold current when the difference between the measured value and the target value is within the range of 0° to 0.5°.

19. The non-transitory computer readable storage medium of claim 16 wherein the parameter comprises an angle of the platform relative to the boom, wherein first change threshold value is within the range of 0.02° to 0.05° and the first time period is within the range of 100 to 200 milliseconds, and wherein the second change threshold is within the range of 0° to 0.02° and the second time period is within the range of 750 milliseconds to 1.5 seconds.

20. The non-transitory computer readable storage medium of claim 16 wherein:

for platform up movement, the initial threshold current is within the range of 600 to 750 milliamperes and each of the reduced threshold current and the increased threshold current differs from the initial threshold current by an amount within the range of 5 to 30 milliamperes; and for platform down movement, the initial threshold current is within the range of 600 to 750 milliamperes and each of the reduced threshold current and the increased threshold current differs from the initial threshold current by and amount within the range of 5 to 30 milliamperes.

* * * * *